(12) United States Patent
Caillet et al.

(10) Patent No.: US 10,202,305 B2
(45) Date of Patent: *Feb. 12, 2019

(54) SUBSTRATE EQUIPPED WITH A MULTILAYER COMPRISING A PARTIAL METAL FILM, GLAZING UNIT, USE AND PROCESS

(71) Applicant: SAINT-GOBAIN GLASS FRANCE, Courbevoie (FR)

(72) Inventors: Xavier Caillet, Fontenay sous Bois (FR); Ramzi Jribi, Paris (FR); Laura Singh, Paris (FR); Nicolas Mercadier, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 103 days.

This patent is subject to a terminal disclaimer.

(21) Appl. No.: 15/313,695

(22) PCT Filed: May 22, 2015

(86) PCT No.: PCT/FR2015/051354
§ 371 (c)(1),
(2) Date: Nov. 23, 2016

(87) PCT Pub. No.: WO2015/177480
PCT Pub. Date: Nov. 26, 2015

(65) Prior Publication Data
US 2017/0144927 A1      May 25, 2017

(30) Foreign Application Priority Data
May 23, 2014   (FR) .................................... 14 54658

(51) Int. Cl.
*C03C 17/36* (2006.01)
*E06B 3/67* (2006.01)
*E06B 3/673* (2006.01)

(52) U.S. Cl.
CPC .......... *C03C 17/3681* (2013.01); *C03C 17/36* (2013.01); *C03C 17/366* (2013.01);
(Continued)

(58) Field of Classification Search
CPC ............ C03C 17/3681; C03C 17/3644; C03C 17/3626; C03C 17/3639; C03C 17/3649;
(Continued)

(56) References Cited

U.S. PATENT DOCUMENTS

2007/0128449 A1*   6/2007   Taylor ................... C03C 17/007
                                                                            428/432
2011/0236715 A1   9/2011   Polcyn et al.
2014/0272453 A1   9/2014   Polcyn et al.

FOREIGN PATENT DOCUMENTS

FR        2 998 564 A1      5/2014
WO      2014/164674 A2    10/2014
WO      2014/164695 A1    10/2014

OTHER PUBLICATIONS

International Search Report dated Aug. 31, 2015 in PCT/FR2015/051354 filed May 22, 2015.

* cited by examiner

*Primary Examiner* — Donald J Loney
(74) *Attorney, Agent, or Firm* — Oblon, McClelland, Maier & Neustadt, L.L.P.

(57) ABSTRACT

A substrate is coated on one face with a thin-film multilayer including at least one metal functional film based on silver or made of silver having a thickness e of between 7 nm and 20 nm inclusive of these values, and two antireflection coatings each including at least one antireflection film. The functional film is placed between the two antireflection coatings. The multilayer includes an upper discontinuous metal film having a thickness e' of between 0.5 nm and 5 nm inclusive of these values. The upper discontinuous metal (Continued)

50 nm film is located above the only or last metal functional film as counted starting from the face.

16 Claims, 6 Drawing Sheets

(52) U.S. Cl.
CPC ...... *C03C 17/3626* (2013.01); *C03C 17/3639* (2013.01); *C03C 17/3644* (2013.01); *C03C 17/3649* (2013.01); *E06B 3/6715* (2013.01); C03C 2217/212 (2013.01); C03C 2217/216 (2013.01); C03C 2217/256 (2013.01); C03C 2217/261 (2013.01); C03C 2217/281 (2013.01); C03C 2217/73 (2013.01); C03C 2218/156 (2013.01); *E06B 3/67* (2013.01); *E06B 3/673* (2013.01); *Y02B 80/22* (2013.01)

(58) Field of Classification Search
CPC ........ C03C 2217/212; C03C 2217/216; C03C 2217/281; C03C 2217/256; C03C 2217/73; C03C 2217/261; E06B 3/66; E06B 3/6715; E06B 3/673; Y02B 80/22
See application file for complete search history.

⊢——⊣
50 nm

SUBSTRATE EQUIPPED WITH A MULTILAYER COMPRISING A PARTIAL METAL FILM, GLAZING UNIT, USE AND PROCESS

CROSS-REFERENCE TO RELATED APPLICATIONS

The present application is a national stage application of international application no. PCT/FR2015/051354, filed May 22, 2015, and claims priority to French patent application no. 1454658, filed May 23, 2014, the contents and disclosure of each of which are incorporated herein by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

STATEMENT REGARDING PRIOR DISCLOSURES BY THE INVENTOR OR A JOINT INVENTOR

Not Applicable.

BACKGROUND OF THE INVENTION

Field of the Invention

The invention relates to a transparent substrate especially made of a stiff mineral material such as glass, said substrate being coated with a thin-film multilayer comprising one or more functional films able to act on solar radiation and/or long-wavelength infrared radiation.

The invention more particularly relates to a substrate, especially a transparent glazing substrate, equipped with a thin-film multilayer comprising "n" metal functional films, especially functional films based on silver or a metal alloy containing silver, and of "(n+1)" antireflection coatings, where n is an integer $\geq 1$, in alternation, the or each functional film being placed between two antireflection coatings. Each antireflection coating comprises at least one antireflection film, each coating preferably being composed of a plurality of films, at least one film of which, or even each film of which, is an antireflection film. Here, the concept "antireflection film" is synonymous with the concept "dielectric film"; the concept "dielectric film" above all being used in contrast to the concept "metal functional film", the metal nature of such functional films meaning that they cannot be dielectric.

The invention more particularly relates to the use of such substrates in the manufacture of thermally insulating and/or solar-control glazing units. These glazing units may be intended to be used in buildings or vehicles, especially with a view to decreasing the need for air conditioning and/or preventing excessive overheating (what are referred to as "solar-control" glazing units) and/or to decreasing the amount of energy dissipated toward the exterior (what are referred to as "low-E" glazing units) as a result of the continuing increase in the square footage of glazed areas in buildings and vehicle passenger compartments.

These substrates may in particular be integrated into electronic devices, the multilayer then possibly being used as an electrode to conduct a current (lighting device, display device, photovoltaic panel, electrochromic glazing unit, etc.), or may be integrated into glazing units having particular functionalities, such as for example heated glazing units.

Description of the Related Art Including Information Disclosed Under 37 CFR 1.97 and 1.98

One type of film multilayer known to provide substrates with such properties is formed with a metal functional film having reflective properties in the infrared and/or with respect to solar radiation, especially a metal functional film based on silver or a metal alloy containing silver or made entirely of silver.

In this type of multilayer, the metal functional film is thus located between two antireflection dielectric coatings, each of which in general comprises a plurality of films each of which is made of an antireflection material—either a nitride (especially aluminum or silicon nitride) or an oxide.

A blocker coating is however sometimes inserted between one or each antireflection coating and the metal functional film, the blocker coating located under the functional film, i.e. on the same side as the substrate, protecting the functional film during any high-temperature heat treatments, such as bending and/or tempering heat treatments, and the blocker coating located on the functional film, i.e. on the side opposite the substrate, protecting this layer from possible degradation during the deposition of the upper antireflection coating and during any high-temperature heat treatments, such as bending and/or tempering heat treatments.

At the present time, it is generally desired for each metal functional film to be a complete film, i.e. for the entirety of their area and the entirety of their thickness to consist of the metal material in question.

For a given material (silver for example) and under deposition conditions that are conventional for this material, a complete film is considered to be obtained by those skilled in the art only once a certain thickness has been deposited.

The adhesion energy between a complete silver film and antireflection films is very low, of about the order of 1 J/m$^2$, and the adhesion energy between two anti-reflection films is 5 to 9 times higher than that between silver and an antireflection film. The adhesion energy of a multilayer comprising at least one functional film made of silver or based on silver is therefore limited by the low adhesion energy between complete metal functional films and other materials.

BRIEF SUMMARY OF THE INVENTION

The inventors have studied the possibility of depositing thin-film multilayers comprising one or more metal films and of making a single metal functional film or several metal films thinner than the minimum thickness required to obtain a complete film under the conditions in question.

The inventors have observed that multilayers comprising a single metal functional film, this metal functional film being discontinuous, and multilayers comprising a discontinuous metal film above the only or last continuous metal functional film of the multilayer are highly mechanically resistant and indeed, even more surprisingly, highly chemically resistant.

Furthermore, the inventors have observed that the multilayers thus produced are transparent (no haze and no iridescence) and of color, either in transmission or in reflection, similar to that obtained with multilayers with (a) similar complete metal functional film(s).

It is thus possible to use the specific range of nonuniform absorption in the visible of such a discontinuous metal film to obtain specific absorption effects in certain wavelength ranges and to neutralize certain color characteristics (color in reflection on the multilayer side or substrate side in particular).

Regarding the prior art, multilayers comprising three metal functional films, the first metal functional film of which is discontinuous and located between the two others, are known from international patent application WO 2011/123402. This discontinuous film has a high light absorbance in the visible and it is stated that deposition of this discontinuous metal film on zinc stannate rather than zinc oxide increases the light absorbance of the multilayer, i.e. of the discontinuous metal film, in the visible. However, light absorbance values are not indicated for examples 1 to 5 and 9 or for counter example 6.

Moreover, integrated values for light transmittance and light reflectance on the substrate or multilayer side are not indicated; only the colors after tempering in the L*a*b* system, in reflection multilayer side, in reflection substrate side and in transmission, are indicated for coated substrates not incorporated into glazing units (table 1).

Light transmission (VLT) is indicated for examples 1-4, but only after the coated substrate has been incorporated into a double glazing unit; it is on average 40%.

Thus, one subject of the invention in its broadest acceptance, is a substrate coated on one face with a thin-film multilayer comprising at least one metal functional film based on silver or made of silver having a thickness e comprised between 7 nm and 20 nm inclusive of these values, and two antireflection coatings, said antireflection coatings each comprising at least one antireflection film, said functional film being placed between the two antireflection coatings. Said multilayer comprises a discontinuous metal film having a thickness e' comprised between 0.5 nm and 5 nm inclusive of these values, said discontinuous metal film being located above the only or last metal functional film as counted starting from said face.

DETAILED DESCRIPTION OF THE INVENTION

Figure 1:
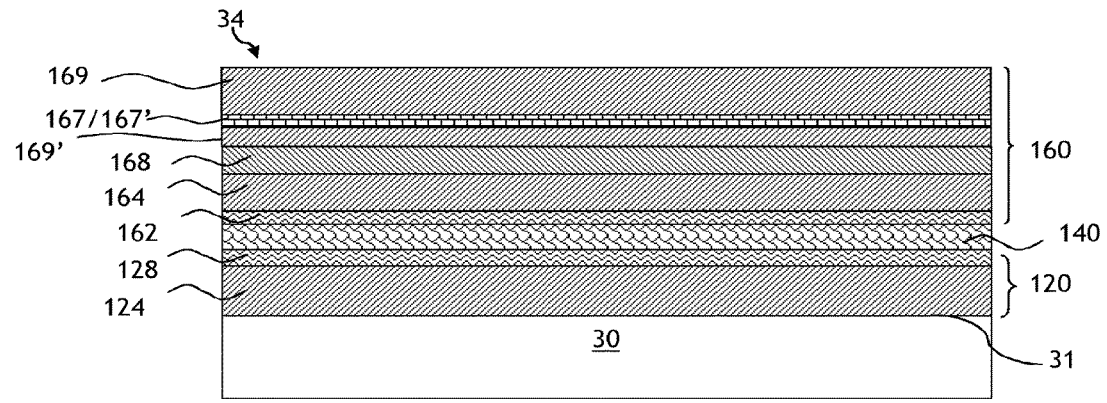
FIG. 1 shows a multilayer containing one functional film and one discontinuous metal film, the discontinuous metal film being deposited above the metal functional film.

In one variant, said multilayer comprises only one upper discontinuous metal film.

In another variant, said multilayer furthermore comprises a lower discontinuous metal film having a thickness e' comprised between 0.5 nm and 5 nm inclusive of these values, said lower discontinuous metal film being located between, on the one hand, said face and, on the other hand, the only or first metal functional film as counted starting from said face. In this variant, said multilayer then preferably comprises only two discontinuous metal films, namely a lower discontinuous metal film and an upper discontinuous metal film.

According to the invention, the discontinuous metal film thus deposited, or each discontinuous metal film thus deposited, is a self-structuring layer the structure of which takes the form of interconnected islands, the zones between the islands not being covered.

Said lower discontinuous metal film is preferably located within an upper antireflection coating; i.e. the last antireflection coating of the multilayer as counted starting from the substrate, and has an antireflection film on each side; furthermore, the optional upper discontinuous metal film is preferably located within a lower antireflection coating and has an antireflection film on each side.

In the case where said thin-film multilayer comprises a plurality of metal functional films, especially a plurality of metal functional films based on silver or made of silver, preferably none of the antireflection coatings that are located between two metal functional films comprises a discontinuous metal film having a thickness comprised between 0.5 nm and 5 nm inclusive of these values.

In the context of the invention, the discontinuous metal film, or each discontinuous metal film may have a thickness e' comprised between 0.5 nm and 2 nm inclusive of these values.

Preferably, said, or each, discontinuous metal film is located, on the one hand, directly on an antireflection film having a refractive index at 550 nm of at least 1.9, and, on the other hand, directly under an antireflection film having a refractive index at 550 nm of at least 1.9; for said, or each, discontinuous metal film, the refractive index of said antireflection film directly below is preferably identical to the refractive index of said antireflection film directly above.

Preferably, said, or each, discontinuous metal film is moreover located, on the one hand, directly on an antireflection film having an optical thickness at 550 nm comprised between 1 nm and 8 nm inclusive of these values, or even comprised between 2 nm and 6 nm inclusive of these values, and, on the other hand, directly under an antireflection film having an optical thickness at 550 nm comprised between 1 nm and 8 nm inclusive of these values, or even comprised between 2 nm and 6 nm inclusive of these values.

As this single discontinuous metal film, or most preferably in the multilayer these two discontinuous metal films, is (are) not continuous, this allows the antireflection films that surround the or each discontinuous metal film to make direct contact. The antireflection films adhere strongly to each other in these zones of direct contact. Any crack that forms at the weakest interface i.e. at the interface between the discontinuous metal film and the adjacent antireflection film, will therefore have to propagate between the two antireflection films to advance, and will thus require a higher energy to do so. The adhesion energy of the multilayer in this location is thus considerably improved, in particular relative to the case of a continuous absorber film.

In the context of the present invention, the expression "discontinuous film" will be understood to mean that, if a square of any size is considered on the surface of the multilayer according to the invention, then, in this square, the discontinuous functional film is preferably present only over 50% to 98% of the area of the square, or even over 53% to 83% of the area of the square, or even over 63% to 83%, respectively.

The square considered is located in a main portion of the coating; it is not a question in the context of the invention of producing a particular border or particular margin that would then be hidden in the final application.

According to the invention, this type of self-structuring discontinuous metal film has an adhesion energy higher than that of a continuous functional film and its optical properties (light transmittance, light reflectance and emissivity) though worse remain in ranges that are acceptable for certain specific applications.

Preferably, said, or each, discontinuous metal film is based on silver or is made of silver.

Preferably, said, or each, discontinuous metal film does not make direct contact, neither above nor below, with a continuous metal film.

It is moreover possible:
for said antireflection coating placed under each metal functional film to comprise an antireflection film of middling index made of a material having a refractive index comprised between 1.8 and 2.2 at 550 nm, this antireflection film of middling index preferably being oxide-based and/or this antireflection film of middling index preferably having a physical thickness comprised between 5 and 35 nm;

for said antireflection coating placed between the face and a first or the only metal functional film to comprise an antireflection film of high index made of a material having a refractive index comprised between 2.3 and 2.7 at 550 nm, this antireflection film of high index preferably being oxide-based and/or this antireflection film of high index preferably having a physical thickness comprised between 5 and 25 nm;

for the antireflection coating placed above a first or the only metal functional film, on the side opposite the face, to comprise an antireflection film of middling index made of a material having a refractive index comprised between 1.8 and 2.2 at 550 nm, this antireflection film of middling index preferably being oxide-based and/or this antireflection film of middling index preferably having a physical thickness comprised between 5 and 35 nm;

for the antireflection coating placed above a first or the only metal functional film, on the side opposite the face, to comprise an antireflection film of high index made of a material having a refractive index comprised between 2.3 and 2.7 at 550 nm, this antireflection film of high index preferably being oxide-based and/or this antireflection film of high index preferably having a physical thickness comprised between 5 and 25 nm;

for said multilayer to comprise two or three metal functional films based on silver or made of silver each having a thickness e comprised between 7 nm and 20 nm inclusive of these values and for said multilayer to furthermore comprise a single upper discontinuous metal film having a thickness e' comprised between 0.5 nm and 5 nm inclusive of these values, said upper metal film being located above the last metal functional film as counted starting from said face; and for said multilayer to comprise two or three metal functional films based on silver or made of silver each having a thickness e comprised between 7 nm and 20 nm inclusive of these values and for said multilayer to furthermore comprise only two discontinuous metal films: a lower discontinuous metal film having a thickness e' comprised between 0.5 nm and 5 nm inclusive of these values, said lower discontinuous metal film being located between, on the one hand, said face and, on the other hand, the only or first metal functional film as counted starting from said face; and an upper discontinuous metal film having a thickness e' comprised between 0.5 nm and 5 nm inclusive of these values, said upper discontinuous metal film being located above the last metal functional film as counted starting from said face.

The term "coating" will be understood, in the context of the present invention, to mean that there may be a single film or a plurality of films of different materials within the coating.

The term "multilayer" is understood to mean a set of thin films deposited one on top of another, without a mineral substrate (substrate made of a mineral material such as glass) or an organic substrate (such as a plastic sheet) interposed therebetween.

As is conventionally the case, when a film is said to be based on a material or to be material-based what is meant is that the film mainly consists of this material, i.e. that the chemical element of the material, or if relevant the product of the material considered in its stable stoichiometric formula, forms at least 50 at % of the film in question.

As is conventionally the case, the expression "metal functional film" designates the deposition of an IR-reflective film that is continuous.

As is also conventionally the case, the expression "anti-reflection film" will, in the context of the present invention, be understood to mean that, from the point of view of its nature, the material is a "non-metal", i.e. it is not a metal. In the context of the invention, this expression designates a material having an n/k ratio in any wavelength range in the visible (from 380 nm to 780 nm) of 5 or more.

It will be recalled that n designates the real refractive index of the material at a given wavelength and k represents the imaginary component of the refractive index at a given wavelength; the ratio n/k is calculated for a given wavelength.

The refractive index values indicated in the present document are the values measured at a wavelength of 550 nm, as is conventionally the case.

According to the invention, said, or each discontinuous metal film may have a thickness e':
- $1.0 \leq e' \leq 4.5$ nm or even $1.0 \leq e' \leq 4.0$ nm; or $2.0 \leq e' \leq 4.5$ nm or even $2.0 \leq e' \leq 4.0$ nm, deposited on a film based on titanium dioxide $TiO_2$; or
- $1.0 \leq e' \leq 4.5$ nm or even $1.0 \leq e' \leq 4.0$ nm; or $2.0 \leq e' \leq 4.5$ nm or even $2.0 \leq e' \leq 4.0$ nm, deposited on a film based on zinc tin oxide $ZnSnO_x$; or
- $1.0 \leq e' \leq 5.0$ nm or even $1.0 \leq e' \leq 4.5$ nm; or $2.0 \leq e' \leq 5.0$ nm or even $2.0 \leq e' \leq 4.5$ nm, deposited on a film based on zinc oxide ZnO; or
- $1.0 \leq e' \leq 5.0$ nm or even $1.0 \leq e' \leq 4.0$ nm; or $2.0 \leq e' \leq 5.0$ nm or even $2.0 \leq e' \leq 4.0$ nm, deposited on a film based on silicon nitride $Si_3N_4$.

Preferably, the multilayer according to the invention is deposited directly on the face of the substrate.

For a multilayer according to the invention comprising a single continuous metal functional film, this functional film may have a thickness comprised between 8 and 17 nm, or even between 10 and 15 nm, or even between 12 and 14 nm in order to obtain an effective low-E multilayer.

In another particular version of the invention, at least one metal functional film is deposited directly on an under-blocker coating placed between the functional film and the antireflection coating subjacent to the functional film and/or at least one functional film is deposited directly under an over-blocker coating placed between the functional film and the antireflection coating superjacent to the functional film and the under-blocker coating and/or the over-blocker coating comprises a thin film based on nickel or titanium having a physical thickness comprised between 0.2 nm and 2.5 nm inclusive of these values.

The last film of the superjacent antireflection coating, i.e. the film furthest from the substrate, may be oxide-based, and is then preferably deposited in substoichiometric form; it may especially be based on titanium dioxide (on $TiO_x$) or based on mixed tin zinc oxide (on $Sn_zZn_yO_x$).

The last film (or overcoat) of the multilayer may thus be a protective film preferably deposited in substoichiometric form. This film ends up oxidized, stoichiometrically for the most part, in the multilayer after the deposition.

The invention furthermore relates to a multiple glazing unit comprising at least two substrates that are held together by a frame structure, said glazing unit separating an exterior space from an interior space, in which at least one intermediate gas-filled cavity is placed between the two substrates, one substrate being according to the invention.

As a particular variant, the multilayer according to the invention is positioned on face 4 of a double glazing unit, i.e. on a face of the glazing unit that is not protected by the intermediate gas-filled cavity, as the multilayer is particularly resistant.

The glazing unit according to the invention incorporates at least the substrate bearing the multilayer according to the invention, optionally associated with at least one other substrate. Each substrate may be clear or tinted. One of the substrates at east may in particular be made of bulk-tinted glass. The type of tint chosen will depend on the light transmittance and/or color that it is desired for the glazing unit to have once manufactured.

The glazing unit according to the invention may have a laminated structure, especially associating at east two stiff glass substrates with at east one thermoplastic polymer sheet, in order to obtain a glass/thin-film multilayer/sheet(s)/glass/glass sheet structure. The polymer may especially be based on polyvinyl butyral PVB, ethylene vinyl acetate EVA, polyethylene terephthalate PET or polyvinyl chloride PVC.

The invention furthermore relates to the use of a, and preferably at most two, discontinuous metal film(s) according to the invention in a multilayer comprising at least one metal functional film based on silver or made of silver having a thickness e comprised between 7 nm and 20 nm inclusive of these values, and two antireflection coatings, said antireflection coatings each comprising at least one antireflection film, said functional film being placed between the two antireflection coatings, said multilayer furthermore comprising an upper discontinuous metal film having a thickness e' comprised between 0.5 nm and 5 nm inclusive of these values, said upper discontinuous metal film being located above the only or last metal functional film as counted starting from said face; an optional other discontinuous metal film being a lower discontinuous metal film located between, on the one hand, said face and, on the other hand, the only or first metal functional film as counted starting from said face and having a thickness e' comprised between 0.5 nm and 5 nm inclusive of these values.

The invention furthermore relates to a process for depositing a, and preferably at most two, discontinuous metal film(s) according to the invention in a multilayer comprising at least one metal functional film based on silver or made of silver having a thickness e comprised between 7 nm and 20 nm inclusive of these values, and two antireflection coatings, said antireflection coatings each comprising at least one antireflection film, said functional film being placed between the two antireflection coatings, said multilayer furthermore comprising an upper discontinuous metal film having a thickness e' comprised between 0.5 nm and 5 nm inclusive of these values, said upper discontinuous metal film being located above the only or last metal functional film as counted starting from said face; an optional other discontinuous metal film being a lower discontinuous metal film located between, on the one hand, said face and, on the other hand, the only or first metal functional film as counted starting from said face and having a thickness e' comprised between 0.5 nm and 5 nm inclusive of these values.

Advantageously, the present invention thus allows a thin-film multilayer to be obtained having (deposited on a transparent substrate) a light transmittance in the visible $T_L > 50\%$, a light reflectance in the visible $R_C$ (multilayer side) lower than 20% and even lower than 10%, and a relatively neutral color in transmission and reflection, the emissivity of the coated substrate being lower than that of the substrate by itself.

Advantageously, the present invention thus allows a thin-film multilayer to be produced comprising 1, 2, 3, 4 or even more metal functional films based on silver or made of silver and containing one, and preferably at most two, discontinuous metal films, so that the multilayer is highly mechanically resistant and/or highly chemically resistant.

Figure 2:
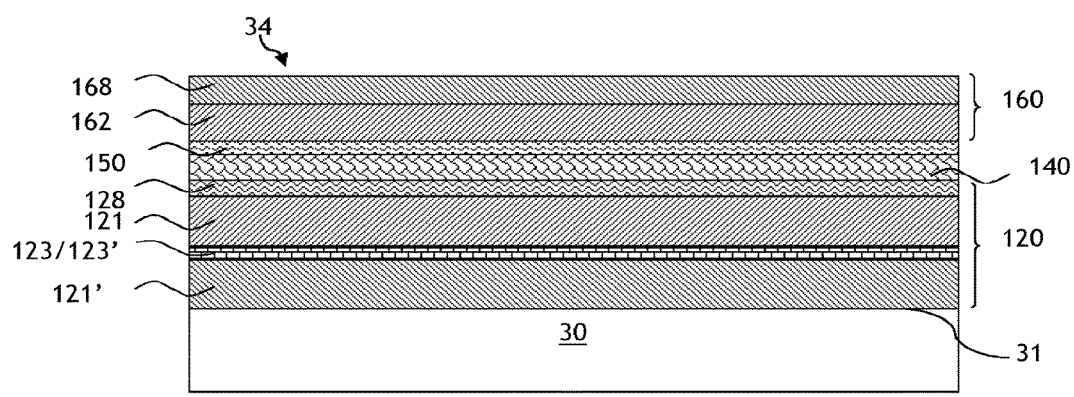
FIG. 2 shows a multilayer containing one functional film and one discontinuous metal film, the discontinuous metal film being deposited under the metal functional film.
Figure 3:
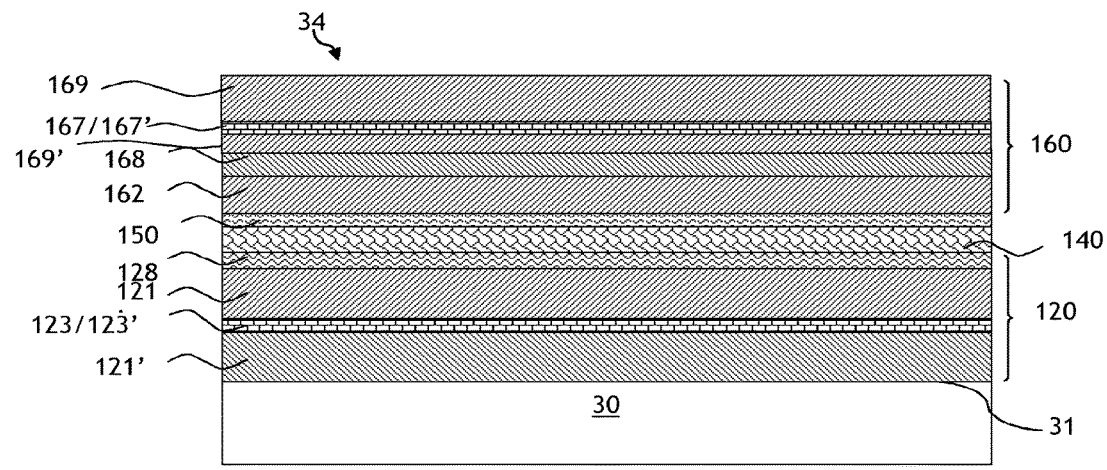
FIG. 3 shows a multilayer containing one functional film and two discontinuous metal films, one discontinuous metal film being deposited above the metal functional film and one discontinuous metal film being deposited under the metal functional film.
Figure 4:
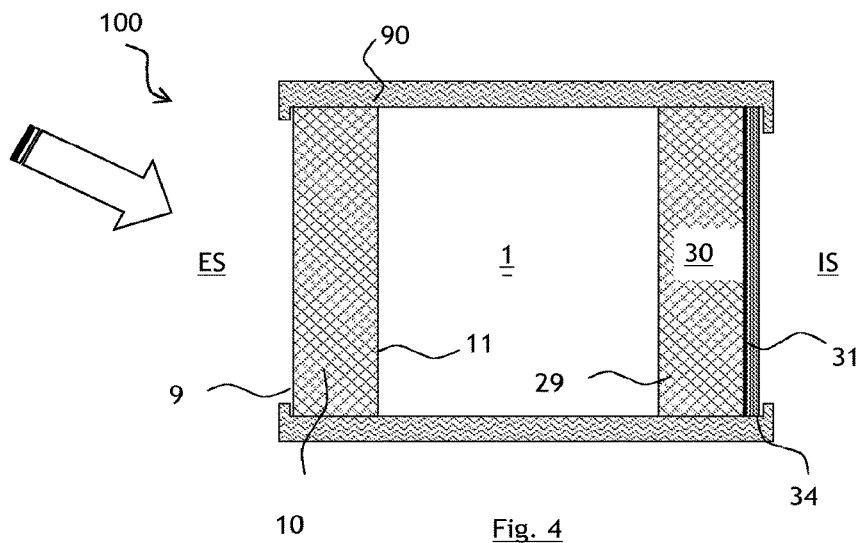
FIG. 4 shows a double-glazing unit solution incorporating a multilayer according to the invention.
Figure 5:
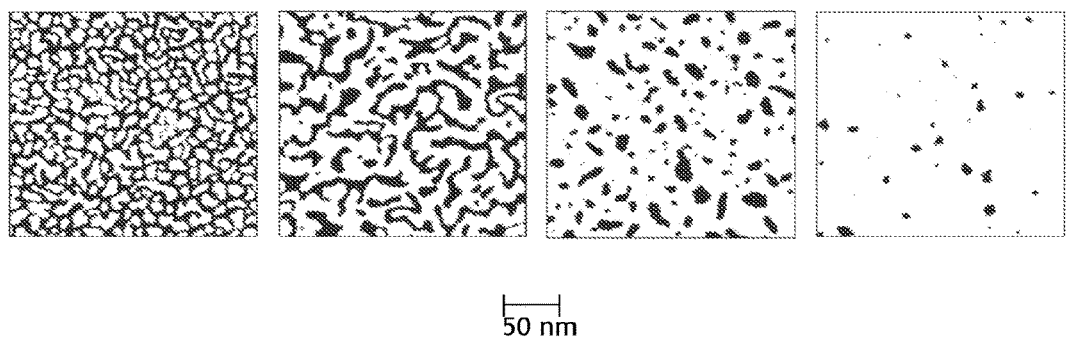
FIG. 5 shows binary TEM micrographs of, from left to right, a discontinuous metal film made of silver having a degree of areal occupation of 53% to 98%.
Figure 6:
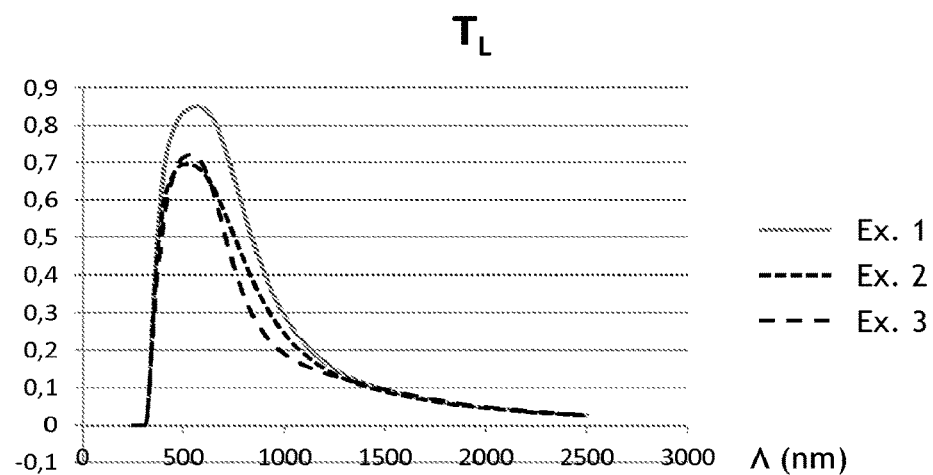
FIG. 6 shows the light transmittance $T_L$ of examples 1 to 3 as a function of wavelength $\lambda$.
Figure 7:
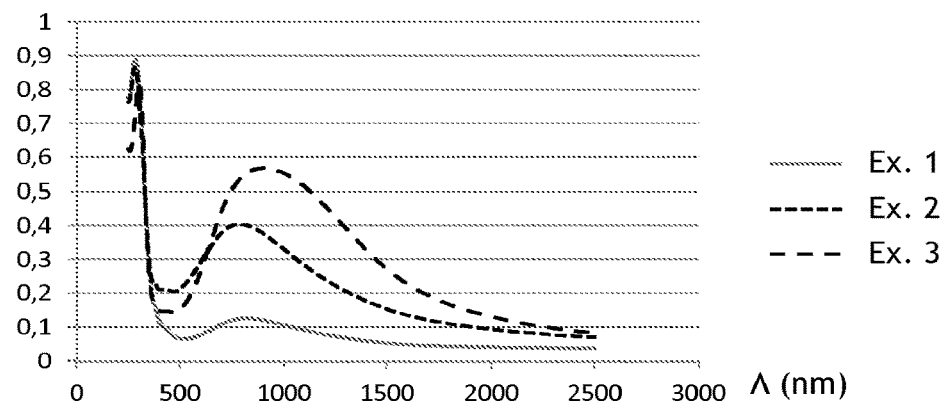
FIG. 7 shows the absorption spectrum Ab of examples 1 to 3 as a function of wavelength $\lambda$.
Figure 8:
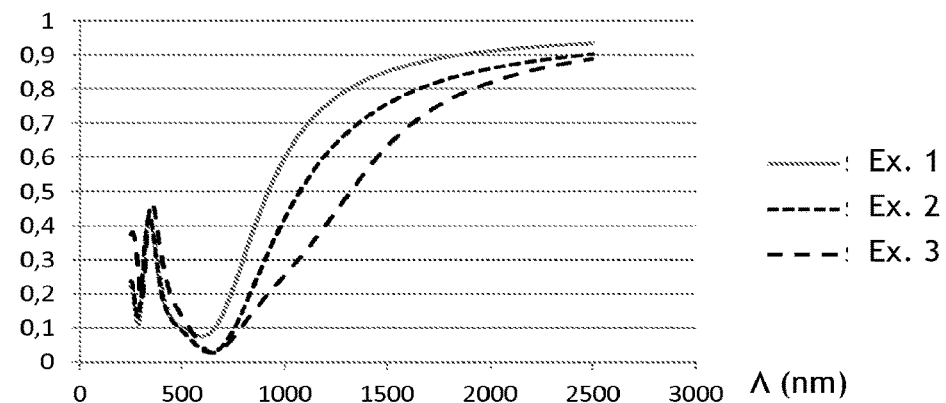
FIG. 8 shows the light reflectance $R_L$ of examples 1 to 3 as a function of wavelength $\lambda$.
Figure 9:
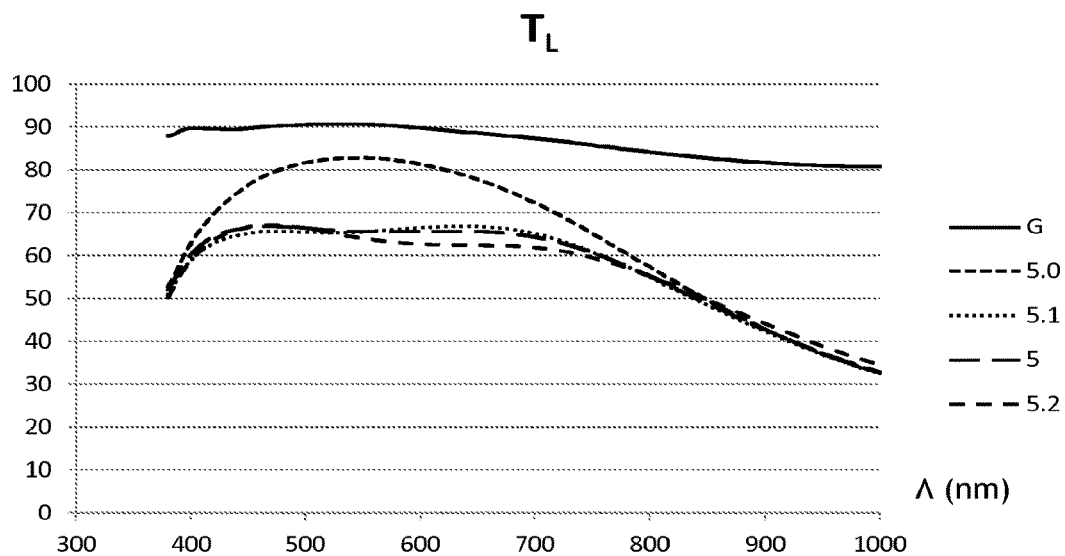
FIG. 9 shows the light transmittance $T_L$, in %, of the substrate alone and of examples 5, 5.0, 5.1 and 5.2 as a function of wavelength $\lambda$.
Figure 10:
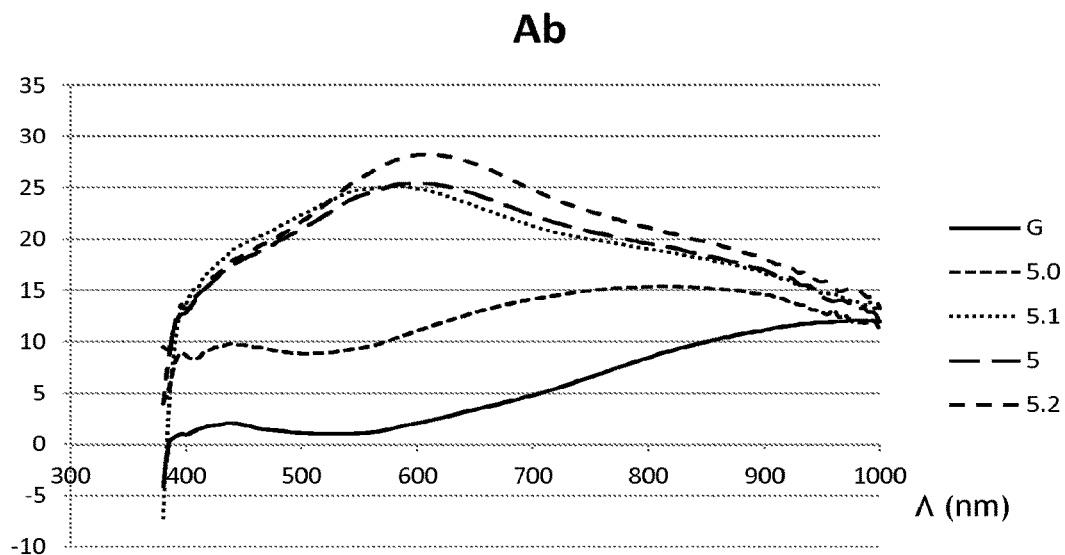
FIG. 10 shows the absorption spectrum Ab, in %, of the substrate alone and of examples 5, 5.0, 5.1 and 5.2 as a function of wavelength $\lambda$.
Figure 11:
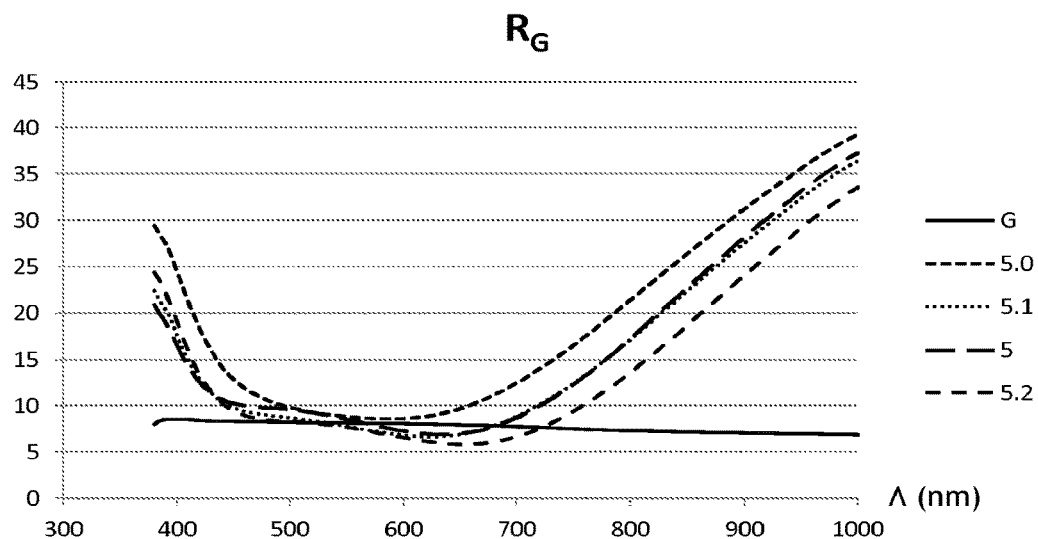
FIG. 11 shows the light reflectance $R_G$, in %, on the side opposite the multilayer, of the substrate alone and of examples 5, 5.0, 5.1 and 5.2 as a function of wavelength $\lambda$.
Figure 12:
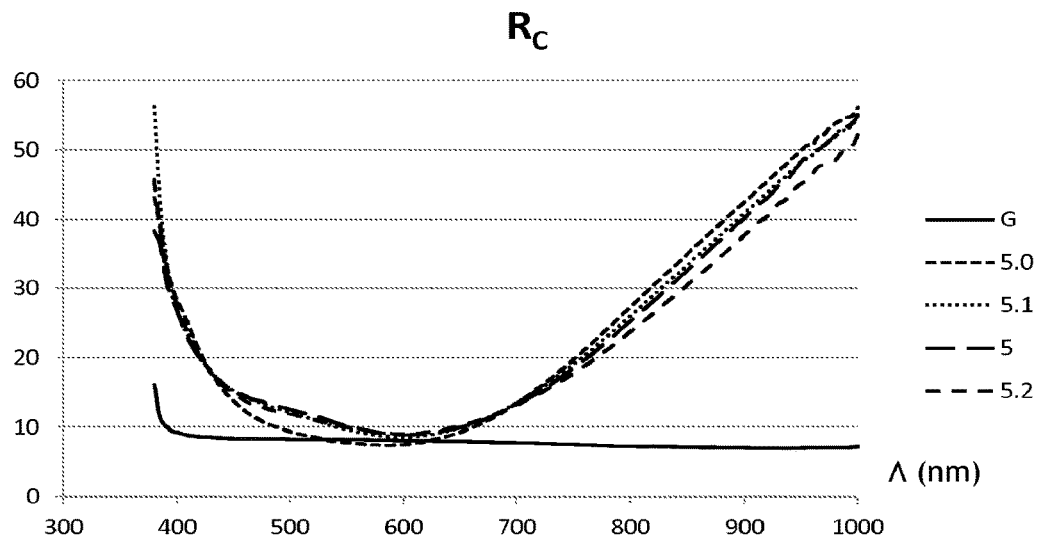
FIG. 12 shows the light reflectance $R_C$, in %, on the multilayer side, of the substrate alone and of examples 5, 5.0, 5.1 and 5.2 as a function of wavelength $\lambda$.
Figure 13:
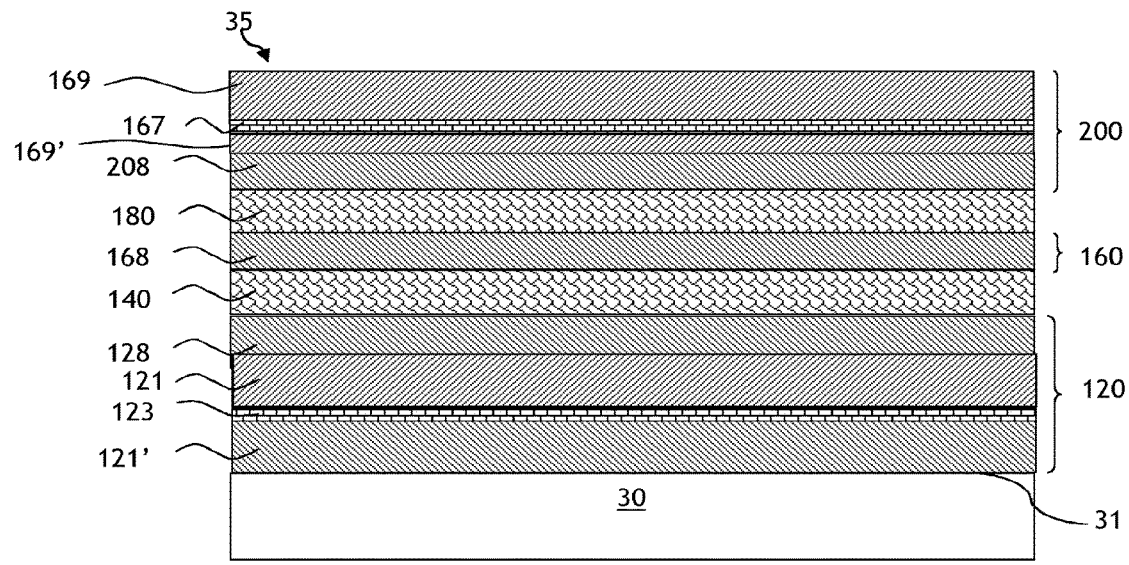
FIG. 13 shows a multilayer containing two functional films and two discontinuous metal films, one discontinuous metal film being deposited under the first metal functional film and one discontinuous metal film being deposited above the second metal functional film.
Figure 14:
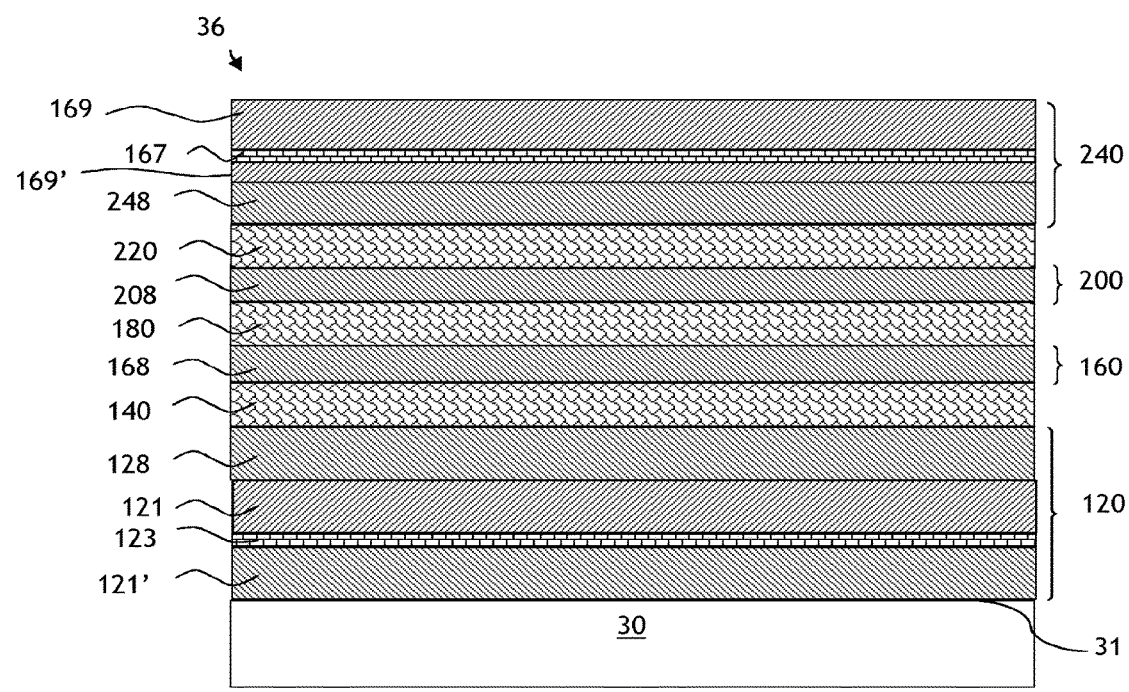
FIG. 14 shows a multilayer containing three functional films and two discontinuous metal films, one discontinuous metal film being deposited under the first metal functional film and one discontinuous metal film being deposited above the third metal functional film.

Details and advantageous features of the invention will become apparent from the following nonlimiting examples, which are illustrated in the appended figures, which show:

FIG. 1, a multilayer containing one functional film and one discontinuous metal film, the discontinuous metal film being deposited above the metal functional film;

FIG. 2, a multilayer containing one functional film and one discontinuous metal film, the discontinuous metal film being deposited under the metal functional film;

FIG. 3, a multilayer containing one functional film and two discontinuous metal films, one discontinuous metal film being deposited above the metal functional film and one discontinuous metal film being deposited under the metal functional film;

FIG. 4, a double-glazing unit solution incorporating a multilayer according to the invention;

FIG. 5, binary TEM micrographs of, from left to right, a discontinuous metal film made of silver having a degree of areal occupation of 53% to 98%;

FIG. 6, the light transmittance $T_L$ (expressed in the form of a factor ranging from 0 to 1 for values conventionally considered 0 to 100%) of examples 1 to 3 as a function of wavelength $\lambda$;

FIG. 7, the absorption spectrum Ab (expressed in the form of a factor ranging from 0 to 1 for values conventionally considered 0 to 100%) of examples 1 to 3 as a function of wavelength $\lambda$;

FIG. 8, the light reflectance $R_L$ (expressed in the form of a factor ranging from 0 to 1 for values conventionally considered 0 to 100%) of examples 1 to 3 as a function of wavelength $\lambda$;

FIG. 9, the light transmittance $T_L$, in %, of the substrate alone and of examples 5, 5.0, 5.1 and 5.2 as a function of wavelength $\lambda$;

FIG. 10, the absorption spectrum Ab, in %, of the substrate alone and of examples 5, 5.0, 5.1 and 5.2 as a function of wavelength $\lambda$;

FIG. 11, the light reflectance $R_G$, in %, on the side opposite the multilayer, of the substrate alone and of examples 5, 5.0, 5.1 and 5.2 as a function of wavelength $\lambda$;

FIG. 12, the light reflectance $R_C$, in %, on the multilayer side, of the substrate alone and of examples 5, 5.0, 5.1 and 5.2 as a function of wavelength $\lambda$;

FIG. 13, a multilayer containing two functional films and two discontinuous metal films, one discontinuous metal film being deposited under the first metal functional film and one discontinuous metal film being deposited above the second metal functional film; and FIG. 14 a multilayer containing three functional films and two discontinuous metal films, one discontinuous metal film being deposited under the first metal functional film and one discontinuous metal film being deposited above the third metal functional film.

FIGS. 1 to 3 illustrate a structure of a one-functional-film multilayer 34, i.e. of a multilayer containing one functional film, deposited on a transparent glazing substrate 30 and more precisely on one face 31 of this substrate 30, in which structure the one functional film 140, based on silver or a metal alloy containing silver and preferably made only of silver, is placed between two antireflection coatings, the subjacent antireflection coating 120 being located under the functional film 140, i.e. on the same side as the substrate 30, and the subjacent antireflection coating 160 being placed above the functional film 140, i.e. on the side opposite the substrate 30.

These two antireflection coatings 120, 160 each comprise at least one antireflection film 128, 168.

Optionally, on the one hand the functional film 140 may be deposited directly on an under-blocker coating placed between the subjacent antireflection coating 120 and the functional film 140, and on the other hand the functional film 140 may be deposited directly under an over-blocker coating 150 placed between the functional film 140 and the superjacent antireflection coating 160.

The under- and/or over-blocker films, although deposited in metal form and presented as being metal films, are in practice oxide films because their primary function is to oxidize during the deposition of the multilayer in order to protect the functional film.

This antireflection coating 160 may terminate with an optional and in particular oxide-based protective film (not illustrated) that is especially substoichiometric in oxygen.

When a multilayer containing one functional film is used in a multiple glazing unit 100 of double glazing unit structure, as illustrated in FIG. 4, this glazing unit comprises two substrates 10, 30 that are held together by a frame structure 90 and that are separated from each other by an intermediate gas-filled cavity 15.

The glazing unit separates in this way an exterior space ES from an interior space IS.

The multilayer according to the invention, because it is highly mechanically resistant, may be positioned on face 4 (on the sheet closest the interior of the building with respect to the incident direction of solar light entering into the building, and on its face on the interior side).

FIG. 4 illustrates this positioning (the incident direction of solar light entering into the building being illustrated by the double arrow) on face 4 of a thin-film multilayer 34 positioned on an exterior face 31 of the substrate 30 making contact with the exterior space ES, the other face 29 of the substrate 30 making contact with the intermediate gas-filled cavity 15.

However, it is also possible to envision, in this double glazing structure, one of the substrates having a laminated structure; however, this cannot possibly be a cause for confusion as in such structures there is no intermediate gas-filled cavity.

A series of seven examples have been produced:
example 1 is a reference example: it is a question of a reference multilayer containing one functional film and no discontinuous metal films;
example 2 is a comparative example that is based on example 1 and that furthermore comprises, in the upper part of the multilayer containing one functional film (i.e. above this functional film, starting from the substrate), a metal absorber film 167';
example 3 is an example that is based on example 1 and that furthermore comprises, in the upper part of the multilayer containing one functional film, an upper discontinuous metal film 167;
example 4 is a comparative example that is based on example 1 and that furthermore comprises, in the lower part of the multilayer containing one functional film (i.e. between this functional film and the substrate) an absorber film 123';
example 5 is an example that is based on example 1 and that furthermore comprises, in the lower part of the multilayer containing one functional film, a lower discontinuous metal film 123;

example 6 is a comparative example that is based on example 1 and that furthermore comprises, in the lower part of the multilayer containing one functional film (i.e. between this functional film and the substrate) an absorber film 123', and that furthermore comprises, in the upper part of the multilayer containing one functional film (i.e. above this functional film, starting from the substrate) and an absorber film 167'; and example 7 is an example that is based on example 1 and that furthermore comprises, in the lower part of the multilayer containing one functional film, a lower 123 discontinuous metal film, and that furthermore comprises, in the upper part of the multilayer containing one functional film, an upper discontinuous metal film 167.

For all the multilayers below, the conditions of deposition of the films were:

| Film | Target employed | Deposition pressure | Gas |
|---|---|---|---|
| $Si_3N_4$:Al | 92:8 wt % Si:Al | $1.5 \times 10^{-3}$ mbar | Ar/(Ar + $N_2$) of 45% |
| $TiO_2$ | $TiO_2$ | $1.5 \times 10^{-3}$ mbar | Ar/(Ar + $O_2$) of 45% |
| ZnO | ZnO | $1.5 \times 10^{-3}$ mbar | Ar/(Ar + $O_2$) of 83% |
| NiCr | 80:20 wt % Ni:Cr | $2 \times 10^{-3}$ mbar | 100% Ar |
| Ag | Ag | $8 \times 10^{-3}$ mbar | 100% Ar |

The films deposited for these examples may thus be classed into five categories:
- i—films made of a dielectric/antireflection material, having an n/k ratio in any wavelength range in the visible higher than 5: films 121, 121', 128, 162, 168, 169, 169' made of $Si_3N_4$:Al, or $TiO_2$, or ZnO;
- ii—continuous metal functional films 140 made of silver, material having reflective properties in the infrared and/or with respect to solar radiation;
- iii—over-blocker films 150 intended to protect the functional film from a modification of its nature during the deposition of the multilayer: Ni, NiCr; their influence on the optical and energetic properties is in general ignored since they are small in thickness (thickness smaller than or equal to 2 nm);
- iv—for examples 3, 5 and 7: discontinuous metal films 123 and/or 167, or DML films, DML standing for discontinuous metal layer; and
- v—for comparative examples 2, 4 and 6: metal absorber films 123' and/or 167' made of titanium; this type of film is a continuous film.

In all the examples the thin-film multilayer was deposited on a substrate, G, that consisted of a 4 mm-thick sheet of the clear soda-lime glass sold under the Planilux brand by SAINT-GOBAIN.

For these multilayers, $T_L$ indicates: the light transmittance in the visible in %, measured under illuminant D65 at 2°;

$a^*_T$ and $b^*_T$ indicate the a* and b* coordinates of the color in transmission in the LAB space measured under illuminant D65 at 2°;

$R_G$ indicates: light reflectance on the glass side (that surface of the substrate which is opposite that on which the multilayer is deposited) in the visible in %, measured under illuminant D64 at 2°;

$a^*_G$ and $b^*_G$ indicate the a* and b* coordinates of the color in reflection in the LAB space measured under illuminant D65 at 2° on the side of the substrate opposite the side coated with the multilayer (face 29);

$R_C$ indicates: light reflectance on the thin-film multilayer side (surface 31 of the substrate) in the visible in %, measured under illuminant D65 at 2°;

$a^*_C$ and $b^*_C$ indicate the a* and b* coordinates of the color in reflection in the LAB space measured under illuminant D65 at 2° on the coated side of the substrate (face 31);

g indicates the G-factor or solar factor of a configuration:
- for examples 1 to 3: the multilayer was placed on the face 3 of a double glazing unit comprising two 4 mm-thick glass substrates separated by a 16 mm-thick argon-filled cavity, the substrate bearing the multilayer thus being the second substrate passed through by incidence of a light; and
- for examples 4 to 7: the multilayer was placed on the face 2 of a double glazing unit comprising two 4 mm-thick glass substrates separated by a 16 mm-thick argon-filled cavity, the substrate bearing the multilayer thus being the first substrate passed through by incidence of a light.

This factor was determined according to standard EN 410 and corresponds to the sum of direct energy transmission through the glazing unit and of secondary heat transfer into the interior.

According to the invention, a discontinuous DML metal film is a discontinuous film that preferably has a degree of areal occupation (as a percentage of the area of the layer that is located just under the discontinuous metal film and that is covered by the discontinuous metal film) comprised between 50% and 98%.

According to the invention, a discontinuous DML metal film is a film that preferably mainly comprises (i.e. comprises at least 50 at %) at least one metal chosen from: Ag, Au, Cu, Pt.

According to the invention, a discontinuous DML metal film is a film that is preferably flanked on each side, above and below, by a film made of a dielectric/antireflection material, the refractive index n of which is preferably at least equal to 1.9.

FIG. 5 shows, from left to right:
- a degree of areal occupation of 53% obtained with a silver thickness of 2 nm; this multilayer having an emissivity $\varepsilon$=88.7%;
- a degree of areal occupation of 63% obtained with a silver thickness of 3 nm; this multilayer having an emissivity $\varepsilon$=49.3%;
- a degree of areal occupation of 84% obtained with a silver thickness of 4 nm; this multilayer having an emissivity $\varepsilon$=23.9%; and
- a degree of areal occupation of 98% obtained with a silver thickness of 5 nm; this multilayer having an emissivity $\varepsilon$=15.7%;
- obtained for a thin-film multilayer Z having the following structure: substrate/ZnO/silver DML film/ZnO, each ZnO film (of a refractive index of n=1.9) having a thickness of 10 nm.

Theoretical calculations show that it is possible to obtain with a multilayer of the Z type an emissivity $\varepsilon_Z$ lower than that of the substrate alone for a DML silver thickness of 5 nm or less, i.e. for a degree of areal occupation between 50% and 98%, but nonetheless higher than that observed.

In the present document, when reference is made to the thickness e of a DML, it is not a question of the thickness measured in the zones covered by the DML or an average thickness, but of the thickness that would be obtained if the film were continuous.

This value may be determined by considering the deposition rate of the film (or more precisely the run speed of the substrate through the deposition chamber in which the metal functional film is deposited) i.e. the amount of material sputtered per unit time, and the area over which the film is deposited. This thickness is very practical because it is directly comparable to the thickness of continuous functional films.

The thickness e' is thus the thickness that would be measured if the deposited film were continuous.

In practice, if normally, under the magnetron sputtering deposition conditions in question (very low pressure, composition of the target, run speed of the substrate, cathode electrical power) the thickness of the functional film is 10 nm, all that is required to obtain a functional film of half the thickness, i.e. of 5 nm thickness, is to decrease the run speed of the substrate by half.

FIG. 5 shows four binary (black/white) transmission electron microscope (TEM) micrographs. In the four micrographs in this figure, the silver is white and the ZnO black.

It was observed that for a multilayer Z of this type adhesion energy is almost constant for a silver thickness of more than 5 nm: this energy is comprised between 1.0 and 1.5 J/m$^2$, which is quite low.

Table 1 below illustrates the geometric or physical thicknesses (i.e. not the optical thicknesses) in nanometers of each of the films of examples 1 to 3, with reference to FIG. 1:

TABLE 1

| Film | Ex. 1 | Ex. 2 | Ex. 3 |
|---|---|---|---|
| 169 - TiO$_2$ | 2 nm | 2 nm | 2 nm |
| 169' - TiO$_2$ | | 167' - Ti 1 nm | 167 - Ag 1 nm |
| | | 2 nm | 2 nm |
| 168 - Si$_3$N$_4$:Al | 30 nm | 28 nm | 28 nm |
| 164 - TiO$_2$ | 11 nm | 11 nm | 11 nm |
| 162 - ZnO | 6 nm | 6 nm | 6 nm |
| 140 - Ag | 13 nm | 13 nm | 13 nm |
| 128 - ZnO | 5 nm | 5 nm | 5 nm |
| 124 - TiO$_2$ | 23 nm | 23 nm | 23 nm |

In examples 1 to 3, the antireflection coating 120 placed between the face 31 and the only metal functional film 140 comprises an antireflection coating 124 of high index made of a material having a refractive index comprised between 2.3 and 2.7 at 550 nm, this high-index antireflection film 124 preferably having a physical thickness comprised between 5 and 25 nm.

In examples 1 to 3, the antireflection coating 160 placed above the only metal functional film 140 comprises an antireflection film 162 of middling index made of a material having a refractive index comprised between 1.8 and 2.2 at 550 nm, this antireflection film 162 of middling index preferably having a physical thickness comprised between 5 and 35 nm.

Table 2 below illustrates the physical thicknesses in nanometers of each of the films of examples 4 and 5, with reference to FIG. 2:

TABLE 2

| Film | Ex. 4 | Ex. 5 |
|---|---|---|
| 168 - Si$_3$N$_4$:Al | 40 nm | 40 nm |
| 162 - ZnO | 5 nm | 5 nm |
| 150 - NiCr | 0.5 nm | 0.5 nm |
| 140 - Ag | 13 nm | 13 nm |

TABLE 2-continued

| Film | Ex. 4 | Ex. 5 |
|---|---|---|
| 128 - ZnO | 5 nm | 5 nm |
| 121' - TiO$_2$ | 20 nm | 20 nm |
| | 123' - NiCr 1 nm | 123 - Ag 1 nm |
| 121 - TiO$_2$ | 3 nm | 3 nm |

Table 3 below illustrates the physical thicknesses in nanometers of each of the films of examples 6 and 7, with reference to FIG. 3:

TABLE 3

| Film | Ex. 6 | Ex. 7 |
|---|---|---|
| 169 - TiO$_2$ | 2 nm | 2 nm |
| | 167' - Ti 1 nm | 167 - Ag 1 nm |
| 169' - TiO$_2$ | 2 nm | 2 nm |
| 168 - Si$_3$N$_4$:Al | 28 nm | 28 nm |
| 162 - ZnO | 5 nm | 5 nm |
| 150 - NiCr | 0.5 nm | 0.5 nm |
| 140 - Ag | 13 nm | 13 nm |
| 128 - ZnO | 5 nm | 5 nm |
| 121' - TiO$_2$ | 20 nm | 20 nm |
| | 123' - NiCr 1 nm | 123 - Ag 1 nm |
| 121 - TiO$_2$ | 3 nm | 3 nm |

Examples 2, 4 and 6 are comparable to examples 3, 5 and 7, respectively, because they all comprise a single metal functional film made of the same material (Ag) and of the same thickness; these examples are also comparable to example 1 because it also comprises a single metal functional film made of the same material (Ag) and of the same thickness; the antireflection coatings are not identical from one series (examples 2-3 form one series, examples 4-5 form one series and examples 6-7 form one series) to another because their compositions have been optimized in order to attempt to obtain the best possible performance.

The following table shows the main optical properties of examples 3, 5 and 7 (comprising one (ex. 3 and 5) or two (ex. 7) DML film(s)) and allows these properties to be compared with those of examples 2, 4 and 6, respectively (comprising one (ex. 2 and 4) or two (ex. 6) Ti absorber film(s) of equivalent thickness to that of each DML film) and with those of example 1 (which does not comprise a DML film or an absorber film).

TABLE 4

| | Ex. 1 | Ex. 2 | Ex. 3 | Ex. 4 | Ex. 5 | Ex. 6 | Ex. 7 |
|---|---|---|---|---|---|---|---|
| $T_L$ (%) | 84.3 | 68.3 | 70.4 | 66.8 | 65.4 | 46.1 | 44.3 |
| $a^*_T$ | -2.02 | -3.02 | -3.73 | -2.4 | 0.08 | -3.32 | 2.55 |
| $b^*_T$ | 4.18 | 1.39 | 3.48 | 6.8 | -0.4 | 0.82 | -6.81 |
| $R_G$ (%) | | | | 9.9 | 8.52 | 17.38 | 12.1 |
| $a^*_G$ | | | | 0.9 | -1.7 | 0.53 | -0.41 |
| $b^*_G$ | | | | -6.4 | -7.1 | 7.01 | -5.09 |
| $R_C$ (%) | 8.51 | 5.90 | 8.26 | 13.5 | 10.3 | 13.36 | 6.53 |
| $a^*_C$ | 2.94 | -4.41 | -5.39 | 1.7 | 2.32 | 1.39 | 1.34 |
| $b^*_C$ | -12.18 | -20.10 | -26.10 | -16.1 | -12.9 | -16.33 | -31.26 |
| g | 0.57 | 0.61 | 0.63 | 0.44 | 0.46 | 0.55 | 0.57 |

Thus it may be seen that it is possible to produce:
a multilayer containing one metal functional film and a discontinuous metal film in the upper antireflection coating (ex. 3) that has a solar factor G higher than that of a multilayer containing one metal functional film and a metal absorber film in the upper antireflection coating (ex. 2) while nonetheless having an almost identical light transmittance in the visible;

a multilayer containing one metal functional film and a discontinuous metal film in the lower antireflection coating (ex. 5) that has a solar factor G higher than that of a multilayer containing one metal functional film and a metal absorber film in the lower antireflection coating (ex. 4) while nonetheless having an almost identical light transmittance in the visible; and a multilayer containing one metal functional film and a discontinuous metal film in the lower antireflection coating and a discontinuous metal film in the upper antireflection coating (ex. 7) that has a solar factor G higher than that of a multilayer containing one metal functional film and a metal absorber film in the lower antireflection coating and a metal absorber film in the lower antireflection coating (ex. 6) while nonetheless having an almost identical light transmittance in the visible.

Furthermore, an improvement in color neutralization was observed, the color in transmission in particular being less yellow—$b^*_T$ is lower or even negative.

FIGS. 6 to 8 show, for examples 1 to 3 respectively, light transmittance $T_L$, absorption Ab and light reflectance on the multilayer side $R_C$ as a function of wavelength $\lambda$ (in nm).

FIG. 6 shows that the multilayer containing a DML film (ex. 3) allows a light transmittance to be obtained in the visible that is very close to that obtained with the multilayer containing a metal absorber film (ex. 2); however, absorption is higher in the far visible and in the near infrared (from 550 nm to 1000 nm) with example 3 than with example 2, and the multilayer-side reflectance is lower in the far visible and in the near infrared (from 550 nm to 1000 nm) with example 3 than with example 2, thereby allowing in the end a higher solar factor to be obtained for a given light transmittance level in the visible.

FIGS. 9 to 12 respectively show, as a function of wavelength $\lambda$ (in nm), light transmittance $T_L$, absorption Ab, substrate-side light reflectance $R_G$ and multilayer-side light reflectance $R_C$, for the substrate G alone, i.e. no films on either of its faces, and for example 5 and examples 5.0, 5.1 and 5.2, the latter examples being based on example 5; there was only one difference between each of examples 5.0, 5.1, 5.2 and example 5:

the thickness of the DML film was 0 nm in example 5.0 (DML film absent);
the thickness of the DML film was 0.9 nm in example 5.1; and
the thickness of the DML film was 1.2 nm in example 5.2.

These figures show that the presence of the DML film increases absorption at the expense of light transmittance but that a low light reflectance is obtained substrate-side and multilayer-side.

Increasing the nominal DML thickness allows the overall absorption level and color selectivity to be increased.

These trials in particular show that a discontinuous metal film having a thickness e' in the range from 0.9 to 1.2 nm is particularly favorable to the obtainment of a relatively high light transmittance in the visible (65-68%) at the same time as having a quite low glass-side light reflectance (6-7%) and a quite low multilayer-side light reflectance (8-9%).

Furthermore, low $b^*_c$ values (of about −15), low $b^*_G$ values (of about −10) and low $a^*_T$ values (of about −1.0 to +0.3) were obtained.

In all the above examples, the and/or each discontinuous metal film 123, 167 is located, on the one hand, directly on an antireflection film 121', 169' having a refractive index at 550 nm of at least 1.9 and even, in this case, of 2.3 (because TiO$_2$ was used), and on the other hand, directly under an antireflection film 121, 169 having a refractive index at 550 nm of at least 1.9 and even, in this case, of 2.3 (because TiO$_2$ was used), the refractive index of said antireflection film 121', 169' directly below here being identical to the refractive index of said antireflection film 121, 169 directly above.

Trials have shown that it is possible to use silicon nitride (Si$_3$N$_4$:Al) of refractive index at 550 nm of 2.0 instead of TiO$_2$ for the films 121, 121', 169, 169'.

It has been observed that the and/or each DML film 123, 167 has an absorption spectrum such that the absorption is relatively low in the wavelength range from 380 nm to 480 nm, relative to the absorption in the wavelength range from 480 nm to 780 nm.

It has moreover been observed that it is not necessary for the and/or each DML film 123, 167 to make direct contact, neither below, nor above, with a continuous metal film, as in this case the specific absorption spectrum of the DML film merges with the (relatively constant in the visible i.e. from 380 nm to 780 nm) absorption spectrum of the continuous metal film with which it makes contact.

FIGS. 13 and 14 illustrate the structure of a multilayer 35 containing two functional films and the structure of a multilayer 36 containing three functional films, respectively, said multilayers being deposited on a transparent glazing substrate 30 and more precisely on one face 31 of said substrate 30.

Each of the functional films 140, 180, 220, which are preferably mainly based on silver or a metal alloy containing silver and more preferably made only of silver, is placed between two antireflection coatings, namely a subjacent antireflection coating 120, 160, 200 located below each functional film 140, 180, 220, i.e. on the same side as the substrate 30, and a superjacent antireflection coating 160, 200, 240 placed above each functional film 140, 180, 220, i.e. on the side opposite the substrate 30.

Each antireflection coating 120, 160, 200, 240 contains at least one antireflection film 128, 168, 208, 248.

FIG. 3 shows a multilayer 34 that comprises a metal functional film 140, preferably a film based mainly on silver or made of silver, that is the only metal functional film of the multilayer, and two discontinuous metal films 123, 167, one of which is located between, on the one hand, said face 31 and, on the other hand, the metal functional film 140, starting from said face 31, the other being located above the metal functional film 140, starting from said face 31.

FIG. 13 illustrates a similar solution for a multilayer 35 containing two functional films. This multilayer 35 comprises two metal functional films 140, 180, which films are preferably based mainly on silver or made of silver, and two discontinuous metal films 123, 167, one of which is located between, on the one hand, said face 31 and, on the other hand, the first metal functional film 140, starting from said face 31, and the other of which is located above the second metal functional film 180, starting from said face 31.

FIG. 14 illustrates a similar solution for a multilayer 36 containing three functional films. This multilayer 36 comprises three metal functional films 140, 180, 220, which are preferably based mainly on silver or made of silver, and two discontinuous metal films 123, 167, one of which is located between, on the one hand, said face 31 and, on the other hand, the first metal functional film 140, starting from said face 31, and the other of which is located above the third metal functional film 220, starting from said face 31.

These three double-DML configurations allow multilayers exhibiting a low light reflectance but having a more neutral color in transmission and reflection than would be the case if the discontinuous metal films were both replaced in each configuration with a metal absorber film, to be obtained.

With regard to the structures in FIGS. 13 and 14, it is possible to provide a single lower discontinuous metal film 123 that will then be located between, on the one hand, said face 31 and, on the other hand, the first metal functional film 140 as counted starting from said face 31, or a single upper discontinuous metal film 167 that will then be located above the last metal functional film 180, 220 as counted starting from said face 31.

Mainly using one (or more) noble metals such as Ag, Au, Pt or Cu allows a DML to be simply and reliably deposited by magnetron sputtering as this process allows the growth of islands to be controlled; specifically, the selective absorption in particular results from the plasmonic character of the metal, which is made possible by an islanded structure.

The present invention is described above by way of example. It will be understood that a person of ordinary skill in the art will be able to produce various variants of the invention without however departing from the scope of the patent such as defined by the claims.

The invention claimed is:

1. A substrate, comprising:
a thin-film multilayer coated on one face of the substrate, the thin-film multilayer comprising at least one metal functional film based on silver or made of silver having a thickness e of between 7 nm and 20 nm inclusive of these values, and two antireflection coatings, said antireflection coatings each comprising at least one antireflection film, said functional film being placed between the two antireflection coatings,
wherein said multilayer comprises an upper discontinuous metal film having a thickness e' of between 0.5 nm and 5 nm inclusive of these values, said upper discontinuous metal film being located above the only or last metal functional film as counted starting from said face,
wherein the upper discontinuous metal film is based on silver or made of silver, and
wherein the upper discontinuous metal film is a discontinuous layer having a surface area occupation factor in the range of 50% to 98% and in the form of interconnected islands with uncovered regions between the islands.

2. The substrate as claimed in claim 1, wherein said multilayer comprises only one upper discontinuous metal film.

3. The substrate as claimed in claim 1, wherein said multilayer further comprises a lower discontinuous metal film having a thickness e' of between 0.5 nm and 5 nm inclusive of these values, said lower discontinuous metal film being located between said face and the only or first metal functional film as counted starting from said face.

4. The substrate as claimed in claim 1, wherein said discontinuous metal film is located directly on an antireflection film having a refractive index at 550 nm of at least 1.9, and directly under an antireflection film having a refractive index at 550 nm of at least 1.9, the refractive index of said antireflection film directly below being identical to the refractive index of said antireflection film directly above.

5. The substrate as claimed in claim 1, wherein said discontinuous metal film is located directly on an antireflection film having an optical thickness at 550 nm comprised between 1 nm and 8 nm inclusive of these values and directly under an antireflection film having an optical thickness at 550 nm comprised between 1 nm and 8 nm inclusive of these values.

6. The substrate as claimed in claim 1, wherein said discontinuous metal film is located directly on an antireflection film having an optical thickness at 550 nm comprised between 2 nm and 6 nm inclusive of these values and directly under an antireflection film having an optical thickness at 550 nm comprised between 2 nm and 6 nm inclusive of these values.

7. The substrate as claimed in claim 1, wherein said antireflection coating placed under each metal functional film comprises an antireflection film of middling index made of a material having a refractive index of between 1.8 and 2.2 at 550 nm.

8. The substrate as claimed in claim 7, wherein said antireflection film of middling index is oxide-based or the antireflection film of middling index has a physical thickness of between 5 and 35 nm.

9. The substrate as claimed in claim 1, wherein the antireflection coating placed between the face and a first or the only metal functional film comprises an antireflection film of high index made of a material having a refractive index of between 2.3 and 2.7 at 550 nm.

10. The substrate as claimed in claim 9, wherein said antireflection film of high index is oxide-based or the antireflection film of high index has a physical thickness of between 5 and 25 nm.

11. The substrate as claimed in claim 1, wherein the antireflection coating placed above a first or the only metal functional film, on the side opposite the face, comprises an antireflection film of middling index made of a material having a refractive index of between 1.8 and 2.2 at 550 nm.

12. The substrate as claimed in claim 11, wherein said antireflection film of middling index is oxide-based or the antireflection film of middling index has a physical thickness of between 5 and 35 nm.

13. A multiple glazing unit, comprising:
at least two substrates that are held together by a frame structure, said glazing unit separating an exterior space from an interior space, in which at least one intermediate gas-filled cavity is placed between the two substrates, at least one of the two substrates being the substrate as claimed in claim 1.

14. A process, comprising:
depositing at least one discontinuous metal film in a thin-film multilayer that is deposited on the substrate as claimed in claim 1.

15. The process as claimed in claim 14, wherein two of the discontinuous metal films are deposited in the thin-film multilayer.

16. The substrate as claimed in claim 1, wherein the surface area occupation factor of the upper discontinuous metal film is in the range of 53% to 83%.

* * * * *